United States Patent
Huang

(10) Patent No.: US 8,344,674 B2
(45) Date of Patent: Jan. 1, 2013

(54) FAN SPEED CONTROL CIRCUIT

(75) Inventor: Yong-Zhao Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 166 days.

(21) Appl. No.: 12/981,490

(22) Filed: Dec. 30, 2010

(65) Prior Publication Data
US 2012/0161683 A1 Jun. 28, 2012

(30) Foreign Application Priority Data
Dec. 24, 2010 (CN) .......................... 2010 1 0604394

(51) Int. Cl.
*H02P 6/00* (2006.01)
(52) U.S. Cl. ................... 318/432; 318/400.01; 388/815; 388/800
(58) Field of Classification Search ................ 318/432, 318/400.01; 388/800, 806, 815, 821, 917
See application file for complete search history.

(56) References Cited

U.S. PATENT DOCUMENTS

| | | | | |
|---|---|---|---|---|
| 4,977,375 A * | 12/1990 | Toth | ............................... | 324/511 |
| 5,481,194 A * | 1/1996 | Schantz et al. | ................ | 324/522 |
| 5,721,474 A * | 2/1998 | Lee et al. | ...................... | 318/434 |
| 5,942,866 A * | 8/1999 | Hsieh | ............................. | 318/268 |
| 6,163,266 A * | 12/2000 | Fasullo et al. | ................. | 340/664 |
| 6,674,257 B2* | 1/2004 | Xi | ............................. | 318/400.22 |
| 7,205,733 B2* | 4/2007 | Xiong et al. | ............. | 318/400.11 |
| 7,619,535 B2* | 11/2009 | Chen et al. | .................... | 340/635 |
| 7,701,158 B2* | 4/2010 | Wu et al. | ...................... | 318/268 |

* cited by examiner

*Primary Examiner* — Rina Duda
(74) *Attorney, Agent, or Firm* — Altis Law Group, Inc.

(57) ABSTRACT

A fan speed control circuit includes a voltage input terminal, a thyristor, a thermistor, and first and second switches. The terminal is grounded through a first resistor and the thermistor, connected to an anode of the thyristor, and connected to a second terminal of the second switch through a second resistor. A node between the resistor and the thermistor is connected to a control terminal of the first switch. A second terminal of the first switch is grounded. A first terminal of the first switch is connected to a control terminal of the thyristor through a third resistor. A fourth resistor is connected between the anode and control terminal of the thyristor. A control terminal of the second switch is connected to the control terminal of the thyristor. A first terminal of the second switch is connected to a cathode of the thyristor and a voltage pin of a fan.

2 Claims, 1 Drawing Sheet

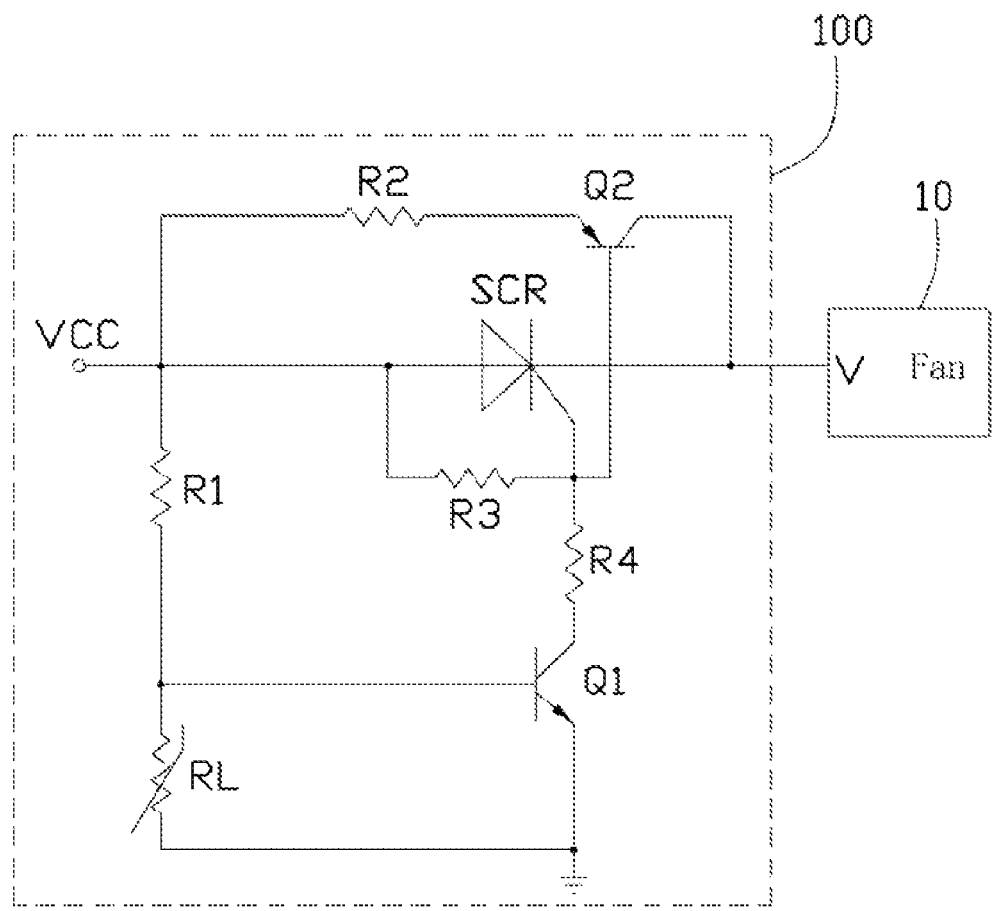

FAN SPEED CONTROL CIRCUIT

BACKGROUND

1. Technical Field

The present disclosure relates to a fan speed control circuit.

2. Description of Related Art

Nowadays, computers are widely used in many fields. For dissipating heat from components, such as central processing units (CPUs), fans are installed on the components. Furthermore, a system fan may be installed on the enclosure of the computer to dissipate heat for the whole motherboard of the computer. The system fan may only maintain a stable speed, which is not effective and waste energy. A fan speed chip can be used to adjust the fan speed of the system according to requirements, however the fan speed chip is very expensive.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawing, all the views are schematic, and like reference numerals designate corresponding parts throughout the several views.

The drawing is a circuit diagram of an embodiment of a fan speed control circuit.

DETAILED DESCRIPTION

The disclosure, including the accompanying drawing, is illustrated by way of example and not by way of limitation. It should be noted that references to "an" or "one" embodiment in this disclosure are not necessarily to the same embodiment, and such references mean at least one.

Referring to the drawing, an embodiment of a fan speed control circuit 100 is provided to control a fan speed of a fan 10. The fan speed control circuit 100 includes a voltage input terminal VCC, a thyristor SCR, a thermistor RL, four resistors R1-R4, and two electronic switches Q1 and Q2. The fan 10 includes a voltage pin V, the fan speed of a fan 10 can be adjusted by changing a receiving voltage of the voltage pin V, which falls within well-known technologies, and is therefore not described here.

In one embodiment, the electronic switch Q1 is npn transistor, and a control terminal, a first terminal, and a second terminal of the electronic switch Q1 are respectively corresponding to a base, a collector, and an emitter of the npn transistor. The electronic switch Q2 is a pnp transistor, and a control terminal, a first terminal, and a second terminal of the electronic switch Q2 are respectively corresponding to a base, a collector, and an emitter of the pnp transistor. The thermistor RL is a negative temperature coefficient thermistor. Namely, if the temperature is increased, a resistance of the thermistor RL is decreased.

The voltage input terminal VCC is used to receive a voltage signal, such as 5 volt (V). The voltage input terminal VCC is grounded through the resistor R1 and the thermistor RL in that order, connected to an anode of the thyristor SCR, and connected to the second terminal of the electronic switch Q2 through the resistor R2. A node between the resistor R1 and the thermistor RL is connected to the control terminal of the electronic switch Q1. A second terminal of the electronic switch Q1 is grounded. The first terminal of the electronic switch Q1 is connected to a control terminal of the thyristor SCR through the resistor R4. The resistor R3 is connected between the anode and the control terminal of the thyristor SCR. The control terminal of the electronic switch Q2 is connected to the control terminal of the thyristor SCR. The first terminal of the electronic switch Q2 is connected to a cathode of the thyristor SCR and the voltage pin V of the fan 10.

When a system including the fan 10 operates in a normal working state, the fan 10 works in a high-speed state. In this state, a voltage of the node between the resistor R1 and the thermistor RL is less than a break-over voltage of the electronic switch Q1, therefore the electronic switch Q1 is turned off. The control terminal of the thyristor SCR is at a high voltage state, therefore the thyristor SCR is turned on and the electronic switch Q2 is turned off. Thus, the voltage pin V of the fan 10 directly receives a voltage signal from the voltage input terminal VCC through the thyristor SCR, which can make the fan 10 maintain the high-speed state.

When the system operates in a low power working state, such as working in a sleep state, the temperature in the system is decreased. Therefore, the resistance of the thermistor RL is increased, which make the voltage of the node between the resistor R1 and the thermistor RL greater than the break-over voltage of the electronic switch Q1. The electronic switch Q1 is turned on, the control terminal of the thyristor SCR is grounded through the electronic switch Q1. The thyristor SCR is turned off and the electronic switch Q2 is turned on. Thus, the voltage pin V of the fan 10 receives a voltage signal from the voltage input terminal VCC through the resistor R2 and the electronic switch Q2. The resistor R2 reduces the voltage provided to the voltage pin V of the fan 10, which can make the fan 10 maintain a low-speed state. Therefore, the fan speed control circuit 100 can control the speed of the fan 10 according to the temperature change, which is very convenient. Furthermore, the fan speed control circuit 100 only uses inexpensive components instead of a fan speed chip, which can save cost.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A fan speed control circuit to control a fan speed of a fan, the fan speed control circuit comprising:
   a voltage input terminal to receive a voltage signal;
   a thyristor;
   a negative temperature coefficient thermistor;
   first to fourth resistors; and
   first and second electronic switches each comprising a control terminal, a first terminal, and a second terminal;
   wherein the voltage input terminal is grounded through the first resistor and the thermistor in that order, connected to an anode of the thyristor, and connected to the second terminal of the second electronic switch through the second resistor, a node between the first resistor and the thermistor is connected to the control terminal of the first electronic switch, the second terminal of the first electronic switch is grounded, the first terminal of the first electronic switch is connected to a control terminal of the thyristor through the fourth resistor, the third resistor is connected between the anode and the control terminal of the thyristor, the control terminal of the second electronic switch is connected to the control terminal of the thyristor, the first terminal of the second electronic switch is connected to a cathode of the thyristor and a voltage pin of the fan, the first electronic switch is turned on in response to the control terminal of the first electronic switch being in a high voltage state, and the second electronic switch is turned on in response to the control terminal of the second electronic switch being in a low voltage state.

2. The fan speed control circuit of claim 1, wherein the first electronic switch is an npn transistor, and the control terminal, the first terminal, and the second terminal of the first electronic switch are respectively corresponding to a base, a collector, and an emitter of the npn transistor, the second electronic switch is a pnp transistor, and the control terminal, the first terminal, and the second terminal of the second electronic switch are respectively corresponding to a base, a collector, and an emitter of the pnp transistor.

* * * * *